(12) United States Patent
Takezawa et al.

(10) Patent No.: US 10,303,410 B1
(45) Date of Patent: May 28, 2019

(54) IMAGE FORMING APPARATUS, IMAGE FORMING METHOD AND NON-TEMPORARY RECORDING MEDIUM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Fusayoshi Takezawa, Tokyo (JP); Takeshi Yasuda, Yokohama Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/912,163

(22) Filed: Mar. 5, 2018

(51) Int. Cl.
| G03G 15/00 | (2006.01) |
| G06F 3/12 | (2006.01) |
| G06F 17/21 | (2006.01) |
| B41J 29/42 | (2006.01) |
| B41J 29/38 | (2006.01) |
| H04N 1/29 | (2006.01) |
| H04N 1/407 | (2006.01) |

(52) U.S. Cl.
CPC ............ *G06F 3/1256* (2013.01); *B41J 29/38* (2013.01); *B41J 29/42* (2013.01); *G03G 15/5016* (2013.01); *G06F 17/212* (2013.01); *H04N 1/29* (2013.01); *H04N 1/407* (2013.01)

(58) Field of Classification Search
CPC .............. G03G 15/5016; G03G 15/502; G06F 3/1256; G06F 17/212
See application file for complete search history.

(56) References Cited

U.S. PATENT DOCUMENTS

| 2001/0028808 | A1* | 10/2001 | Nomura | H04N 1/00352 399/81 |
| 2002/0030838 | A1* | 3/2002 | Toyama | G06K 15/00 358/1.13 |
| 2002/0159786 | A1* | 10/2002 | Yoshimura | H04N 1/0001 399/81 |
| 2006/0167573 | A1* | 7/2006 | Yamada | G03G 15/5016 700/83 |
| 2011/0103819 | A1* | 5/2011 | Sekiya | G03G 15/5075 399/81 |
| 2011/0231026 | A1* | 9/2011 | Yaoyama | G03G 15/5004 700/291 |
| 2012/0188608 | A1 | 7/2012 | Nakatsuka | |

FOREIGN PATENT DOCUMENTS

| JP | 2005-181465 A | 7/2005 |
| JP | 2006-284794 A | 10/2006 |

* cited by examiner

*Primary Examiner* — Sandra Brase
(74) *Attorney, Agent, or Firm* — Foley & Lardner LLP

(57) ABSTRACT

An image forming apparatus include an operation mode determination section, a display section, an image determination section and a display controller. The operation mode determination section determines a current operation mode among a plurality of operation modes for executing an image forming processing. The display section displays an image. The image determination section determines an image indicating the operation mode determined by the operation mode determination section. The display controller displays an image determined by the image determination section and information for supporting an operation by a user relating to the image forming processing on the display section.

18 Claims, 12 Drawing Sheets

FIG.3

| MODE NAME | OPERATION CONTENT |
|---|---|
| NORMAL MODE | IMAGE FORMATION WITH NORMAL TONER |
| ECO-MODE | IMAGE FORMATION WITH DECOLORABLE TONER |

| MODE NAME | COLOR SCHEME INFORMATION | PATTERN INFORMATION |
|---|---|---|
| NORMAL MODE | BLUE | PATTERN A |
| ECO-MODE | GREEN | PATTERN A |

| FUNCTION NAME | DEFAULT MODE NAME |
|---|---|
| COPY | NORMAL MODE |
| PRINTER | NORMAL MODE |
| FAX | NORMAL MODE |

| FUNCTION NAME | CURRENT MODE NAME |
|---|---|
| COPY | ECO-MODE |
| PRINTER | NORMAL MODE |
| FAX | NORMAL MODE |

940
941

| NUMBER OF TIMES OF NORMAL MODE | NUMBER OF TIMES OF ECO-MODE | TOTAL NUMBER OF TIMES |
|---|---|---|
| 10 | 20 | 30 |

| MODE INFORMATION | ICON INFORMATION | ICON LOCATION INFORMATION |
|---|---|---|
| NORMAL MODE | ICON A | UPPER RIGHT |
| ECO-MODE | ICON B | UPPER LEFT |

IMAGE FORMING APPARATUS, IMAGE FORMING METHOD AND NON-TEMPORARY RECORDING MEDIUM

FIELD

Embodiments described herein relate generally to an image forming apparatus, an image forming method and a non-temporary recording medium.

BACKGROUND

An image forming apparatus operates in two operation modes including an operation mode in which printing is executed with a normal toner and an operation mode in which the printing is executed with a decolorable toner decolorized at a prescribed temperature. Such an image forming apparatus operates in a default operation mode if there is no input by a user that instructs the operation mode for the image forming processing. If there is an input by the user, the image forming apparatus operates in an operation mode responsive to the input. The default operation mode may be changed by the input by the user. Therefore, the user needs to confirm on the image forming apparatus whether the operation mode is a desired operation mode when instructing execution of the image forming processing.

DESCRIPTION OF THE DRAWINGS

FIG. 3 is a diagram illustrating a specific example of operation mode information according to the first embodiment;

FIG. 4 is a diagram illustrating a specific example of correspondence image information according to the first embodiment;

FIG. 5 is a diagram illustrating a specific example of default information according to the first embodiment;

FIG. 6 is a diagram illustrating a specific example of current mode information according to the first embodiment;

DETAILED DESCRIPTION

In accordance with an embodiment, an image forming apparatus comprises an operation mode determination section, a display section, an image determination section and a display controller. The operation mode determination section determines a current operation mode among a plurality of operation modes for executing an image forming processing. The display section displays an image. The image determination section determines an image indicating the operation mode determined by the operation mode determination section. The display controller displays the image determined by the image determination section and information for supporting an operation by a user relating to the image forming processing on the display section.

First Embodiment

Figure 1:
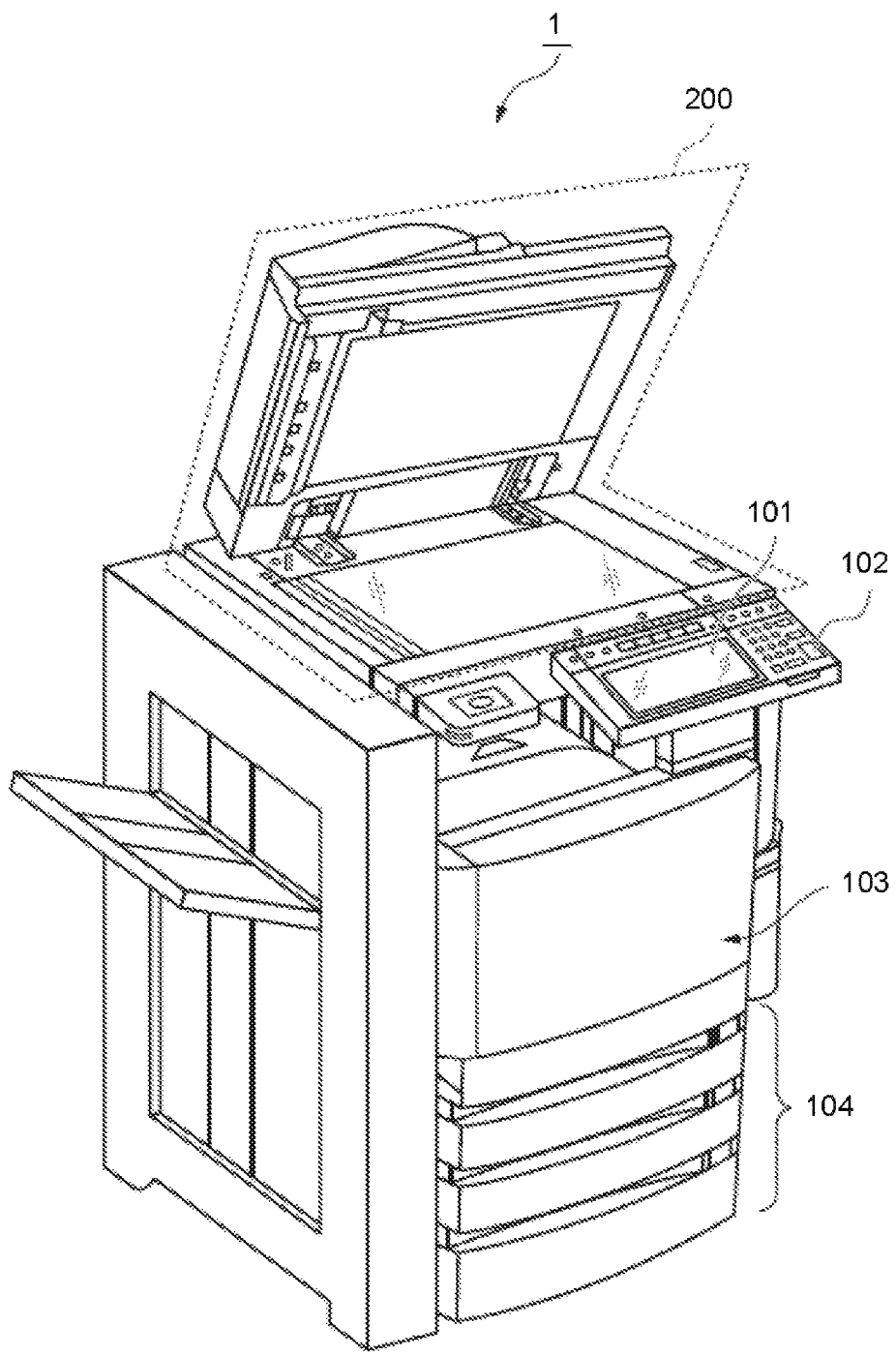
FIG. 1 is an external view exemplifying the overall constitution of an image forming apparatus according to a first embodiment.

FIG. 1 is an external view exemplifying the overall constitution of an image forming apparatus 1 according to the first embodiment. The image forming apparatus 1 has a plurality of operation modes and executes image forming processing in an operation mode in response to an input by a user. The operation mode is a series of operations executed by the image forming apparatus 1 if a command for instructing output of a prescribed result is input to the image forming apparatus 1. Further, the operation mode is a series of operations predetermined in the image forming apparatus 1. The output of the prescribed result refers to an output of a result of an image forming processing by the image forming apparatus 1, such as copying an image or printing out an image.

For the sake of simplicity, the operation mode of the image forming apparatus 1 will be described as having two modes, i.e., a normal mode and an eco-mode.

The normal mode indicates an operation mode in which the image forming apparatus 1 forms an image with a normal toner.

The eco-mode indicates an operation mode in which the image forming apparatus 1 forms an image with a decolorable toner.

The image forming apparatus 1 includes a display 101, a control panel 102, an image forming section 103, a sheet housing section 104 and an image reading section 200. The image forming section 103 of the image forming apparatus 1 may be a device for fixing a toner image or an inkjet type device.

The image forming apparatus 1 reads an image shown on a sheet and generates digital data to generate an image file. The sheet is, for example, an original document, such as a paper on which characters or images are described. The sheet may be a variable object, as long as it can be read by the image forming apparatus 1.

The display 101 is an image display device such as a liquid crystal display, an organic EL (Electro Luminescence) display, or the like. The display 101 displays various information relating to the image forming apparatus 1 and information for supporting an operation of a user relating to an image forming processing. The information for supporting the operation of the user is, for example, icons associated with various functions of the image forming apparatus 1.

The control panel 102 has a plurality of buttons. The control panel 102 receives an input operation from a user. The control panel 102 outputs a signal corresponding to the input operation from the user to a controller of the image forming apparatus 1. The display 101 and the control panel 102 may be integrally provided as a touch panel.

The image forming section 103 forms a visible image on the sheet based on image information generated by the image reading section 200 or image information received via a communication path. For example, the image forming section 103 may form an image by the following processing steps. First, the image forming section 103 forms an electrostatic latent image on a photoconductive drum based on the image information. Then, image forming section 103 forms a visible image by attaching a developer to the electrostatic latent image. A specific example of the developer is toner. After that, a transfer section of the image forming section 103 transfers the visible image onto the sheet. The sheet on which the image is formed may be a sheet stored in the sheet housing section 104 or may be a manually-fed sheet.

The sheet housing section 104 accommodates the sheet used for image formation in the image forming section 103.

The sheet on which the image is formed is determined according to the user input to the control panel 102. It is determined whether the image forming apparatus 1 forms an image on a normal sheet or a reusable sheet according to user input to the control panel 102.

The image reading section 200 reads the image information, for example, using a reading object to process intensity of light. The image reading section 200 records the read image information. The recorded image information may be transmitted to another information processing apparatus via a network. The recorded image information may be used to form an image on the sheet by the image forming section 103.

Figure 2:
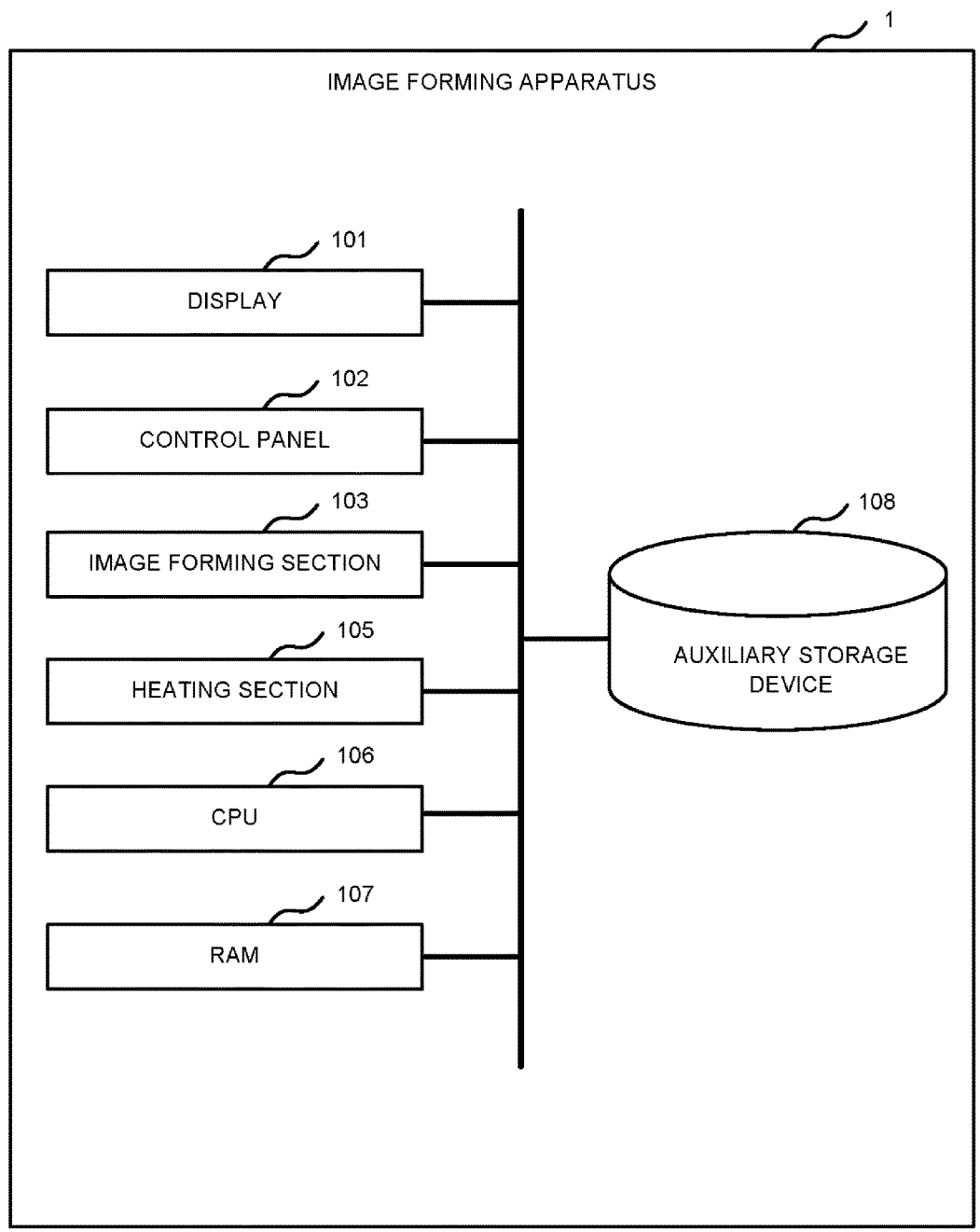
FIG. 2 is a diagram illustrating a specific example of a hardware component of the image forming apparatus according to the first embodiment.

FIG. 2 is a diagram illustrating a specific example of the hardware component of the image forming apparatus 1 according to the first embodiment. The image forming apparatus 1 includes a CPU (Central Processing Unit) 106, a RAM (Random Access Memory) 107, an auxiliary storage device 108, the display 101, the control panel 102, the image forming section 103 and a heating section 105.

The heating section 105 heats the sheet. The heating section 105 executes a fixing processing or a decoloring processing in conjunction with the image forming section 103. The fixing processing refers to a process of heating and pressurizing the sheet onto which the visible image is transferred by the image forming section 103 to fix the transferred visible image on the sheet. The decoloring processing refers to a process of heating a sheet on which an image is formed with the decolorable toner decolorized at a decoloring temperature to a decoloring temperature to decolorize the image formed on the sheet.

The auxiliary storage device 108 is a storage device such as a magnetic hard disk device or a semiconductor storage device. The auxiliary storage device 108 stores various information. For example, various kinds of information include operation mode information, correspondence image information, default information, and current mode information. The operation mode information indicates an operation mode of the image forming apparatus 1. The correspondence image information indicates a display form of an image (hereinafter, referred to as a "correspondence image") associated with the operation mode. The correspondence image is displayed on the display 101 and indicates the operation mode. The correspondence image may be, for example, an image (hereinafter, referred to as a "background image") which is a background of another image displayed on the display 101 and indicating the operation mode by the display form of the background. The correspondence image may be, for example, icons associated with various functions of the image forming apparatus 1, and may be an image indicating the operation mode by the display form of the icon. The correspondence image may be an image indicating the operation mode by information other than a text, for example. If the icon displayed on the display 101 is selected by the user, the image forming apparatus 1 executes processing to execute the function associated with the selected icon. For example, if an icon associated with a copy function is selected by the user, the image forming apparatus 1 reads the image which is the reading object with the image reading section 200 and copies the read image.

The default information indicates an operation mode when the image forming apparatus 1 executes an image processing in a default state. The default state refers to a state of the image forming apparatus 1 in which there is no input to the image forming apparatus 1 by the user in a predetermined prescribed period (hereinafter, referred to as a "default time") and there is no input by the user for instructing the operation mode even after that period. The predetermined prescribed period is, for example, 3 minutes.

The current mode information indicates an operation mode (hereinafter, referred to as a "current mode") set at the present time point for the image forming apparatus 1. The current mode refers to any one operation mode of a plurality of the operation modes of the image forming apparatus 1. The current mode is selected according to the input by the user among the plurality of the operation modes. The current mode is set in the image forming apparatus 1 when the user operates the image forming apparatus 1. For example, if the user inputs a mode instruction input at the time of operating the image forming apparatus 1, the current mode when the user inputs the mode instruction input is an operation mode instructed by the mode instruction input. The mode instruction input is an input to the image forming apparatus 1 for instructing the operation mode for the image forming apparatus 1. For example, when the user newly performs an input after a time greater than or equal to a predetermined default time elapses from the previous input, then, if the newly-performed input at that time is an input other than the mode instruction input, the current mode is the default mode. For example, when the user newly performs an input within the predetermined default time from the previous input, then, if the newly-performed input at that time is an input other than the mode instruction input, the current mode is the operation mode at the time of the previous input. For example, in a case in which the user performs the input newly within the default time since the previous input, if the input newly performed at that time is the mode instruction input, the current mode is the operation mode instructed by the mode instruction input.

For the sake of simplicity, a case in which the correspondence image is the background image of an image displayed on the display 101 is described below.

FIG. 3 is a diagram illustrating a specific example of the operation mode information according to the first embodiment. For example, the operation mode information is stored in the auxiliary storage device 108 as an operation mode table 910 shown in FIG. 3. The operation mode table 910 has records for individual mode names. Each record has values of a mode name and an operation content. The mode name indicates a name of each operation mode. The operation content indicates a content of the operation performed by the image forming apparatus 1 in the operation mode identified by the mode name. For example, a record 911 shows that an image is formed with the decolorable toner in the eco-mode.

FIG. 4 is a diagram illustrating a specific example of the correspondence image information according to the first embodiment. For example, the correspondence image information is stored in the auxiliary storage device 108 as a correspondence image information table 920 shown in FIG. 4. The correspondence image information table 920 has a record for each mode name. Each record has values of a mode name, a color scheme information and pattern information. The mode name is the same as that in FIG. 3. The color scheme information indicates a background color of the image associated with the operation mode identified by the mode name. The pattern information indicates a pattern of the background of the image associated with the operation mode identified by the mode name. For example, a record 921 indicates that the background color of the image indicating the normal mode is blue and the pattern thereof is a pattern A. The pattern may be any pattern, for example, it may a checked pattern, a honeycomb pattern, or a plain pattern.

FIG. 5 is a diagram illustrating a specific example of the default information according to the first embodiment. For example, the default information is stored in the auxiliary storage device 108 as a default information table 930 shown in FIG. 5. The default information table 930 has a record for each function name. Each record has values of a function name and a default mode name. The function name indicates a name of each function of the image forming apparatus 1. For example, the various functions include a copy function, a printer function, a FAX function, and the like. The default mode name indicates a name of the operation mode associated with each function, and indicates the operation mode (hereinafter, referred to as "default mode") of the image forming apparatus 1 in the image forming apparatus 1 in the default state. For example, the record 931 indicates that the default mode of the copy function is the normal mode.

FIG. 6 is a diagram illustrating a specific example of the current mode information according to the first embodiment. For example, the current mode information is stored in the auxiliary storage device 108 as a current mode information table 940 shown in FIG. 6. The current mode information table 940 has a record for each function name. Each record has values of a function name and a current mode name. The function name is the same as that in FIG. 5. The current mode name indicates the current mode associated with the function identified by the function name. For example, a record 941 indicates that the current mode of a function of which the function name is the copy is the eco-mode.

The current mode identified by the current mode name is changed by the input by the user. The current mode identified by the current mode name returns to the default mode if there is no input by the user during the default time.

Figure 7:
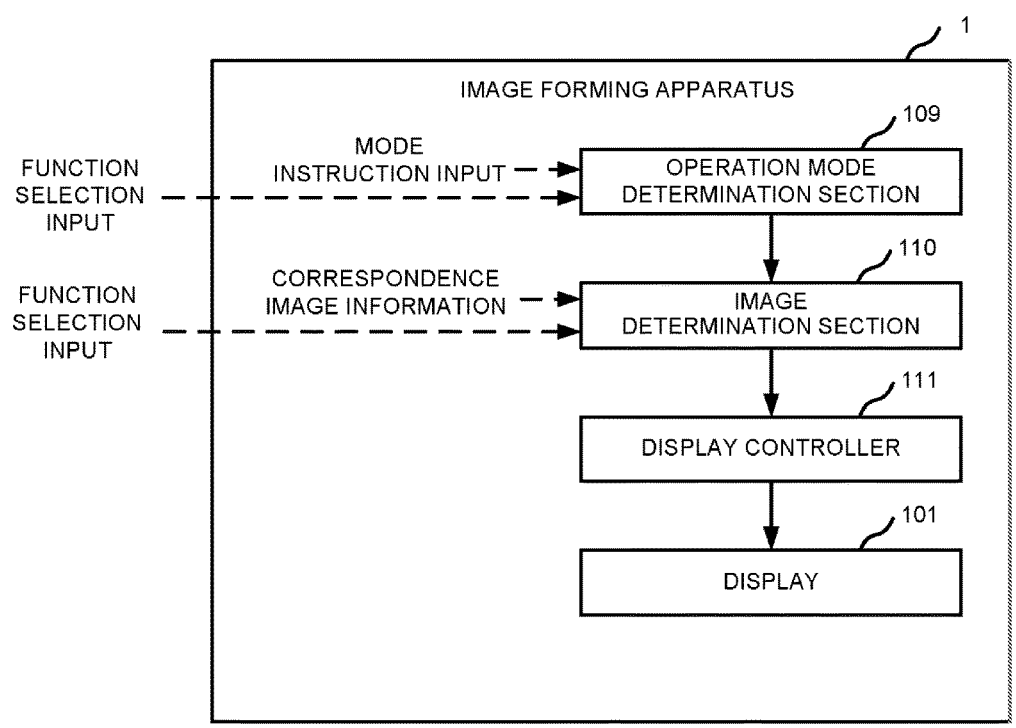
FIG. 7 is a block diagram illustrating specific functional components of the image forming apparatus according to the first embodiment.

FIG. 7 is a block diagram illustrating specific functional components of the image forming apparatus 1 according to the first embodiment. The CPU 106 reads a program stored in the auxiliary storage device 108 into the RAM 107 and executes it, and in this way, the image forming apparatus 1 functions as a device including an operation mode determination section 109, an image determination section 110 and a display controller 111.

Based on the mode instruction input and the time, the operation mode determination section 109 determines the current mode of a desired function selected by the input by the user among various functions of the image forming apparatus 1. The mode instruction input is an input to the image forming apparatus 1 which instructs the operation mode for the image forming apparatus 1. The input by the user for selecting a desired function is referred to as a function selection input below. For the sake of simplicity, the function selected by the function selection input is the copy function, and the operation of the operation mode determination section 109 is described by using a case in which the current mode determined by the operation mode determination section 109 is the current mode of the copy function as a specific example.

The operation mode determination section 109 updates the value of the current mode name in the current mode information table 940 according to the value indicating the determined current mode. Specifically, if the mode instruction input is input to the image forming apparatus 1, the operation mode determination section 109 sets the operation mode instructed by the mode instruction input as the current mode. The operation mode determination section 109 updates the value of the current mode name in the current mode information table 940 according to the value indicating the determined operation mode. The operation mode determination section 109 sets the default mode as the current mode if there is no new input even after the default time elapses since the previous input to the image forming apparatus 1. The operation mode determination section 109 does not update the current mode if no mode instruction input is newly made within the default time after determining the current mode based on the mode instruction input.

For the sake of simplicity, the image forming apparatus 1 according to the first embodiment is described below by assuming that it has only the copy function.

The image determination section 110 determines a correspondence image based on the current mode information stored in the auxiliary storage device 108, the correspondence image information stored in the auxiliary storage device 108, and the function selection input.

The display controller 111 controls display of the image determined by the image determination section 110 on the display 101.

All or a part of the functions of the image forming apparatus 1 are realized by using hardware such as an ASIC (Application Specific Integrated Circuit), a PLD (Programmable Logic Device), and a FPGA (Field Programmable Gate Array). The program may be recorded in a computer-readable recording medium. The computer-readable recording medium is, for example, a portable medium such as a flexible disk, a magneto-optical disk, a ROM, a CD-ROM or the like, or a storage device such as a hard disk built in a computer system. The program may be transmitted via an electric communication line.

Subsequently, with reference to FIG. 8 and FIG. 9, an example in which the display on the display 101 differs depending on the operation mode in the image forming apparatus 1 according to the first embodiment is described.

Figure 8:
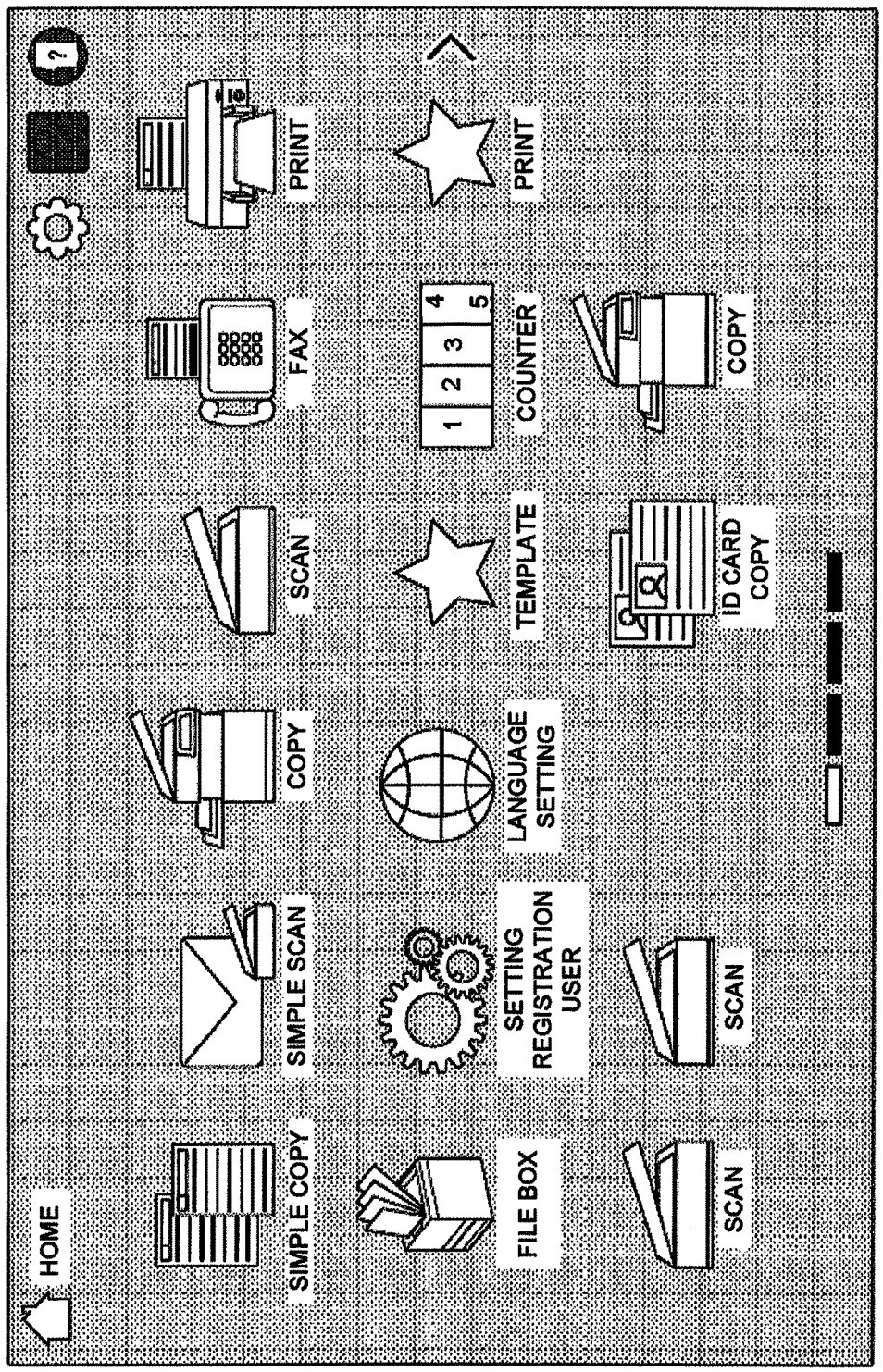
FIG. 8 is a diagram illustrating a specific example of information displayed on a display in an eco-mode according to the first embodiment.

FIG. 8 is a diagram illustrating a specific example of the display on the display 101 in the eco-mode according to the first embodiment. In a screen on which the icon and the text are displayed, an image displayed in an area where there is no icon and text is the background image. The pattern of the background image in FIG. 8 is plain. The color of the background image in FIG. 8 is, for example, green.

Figure 9:
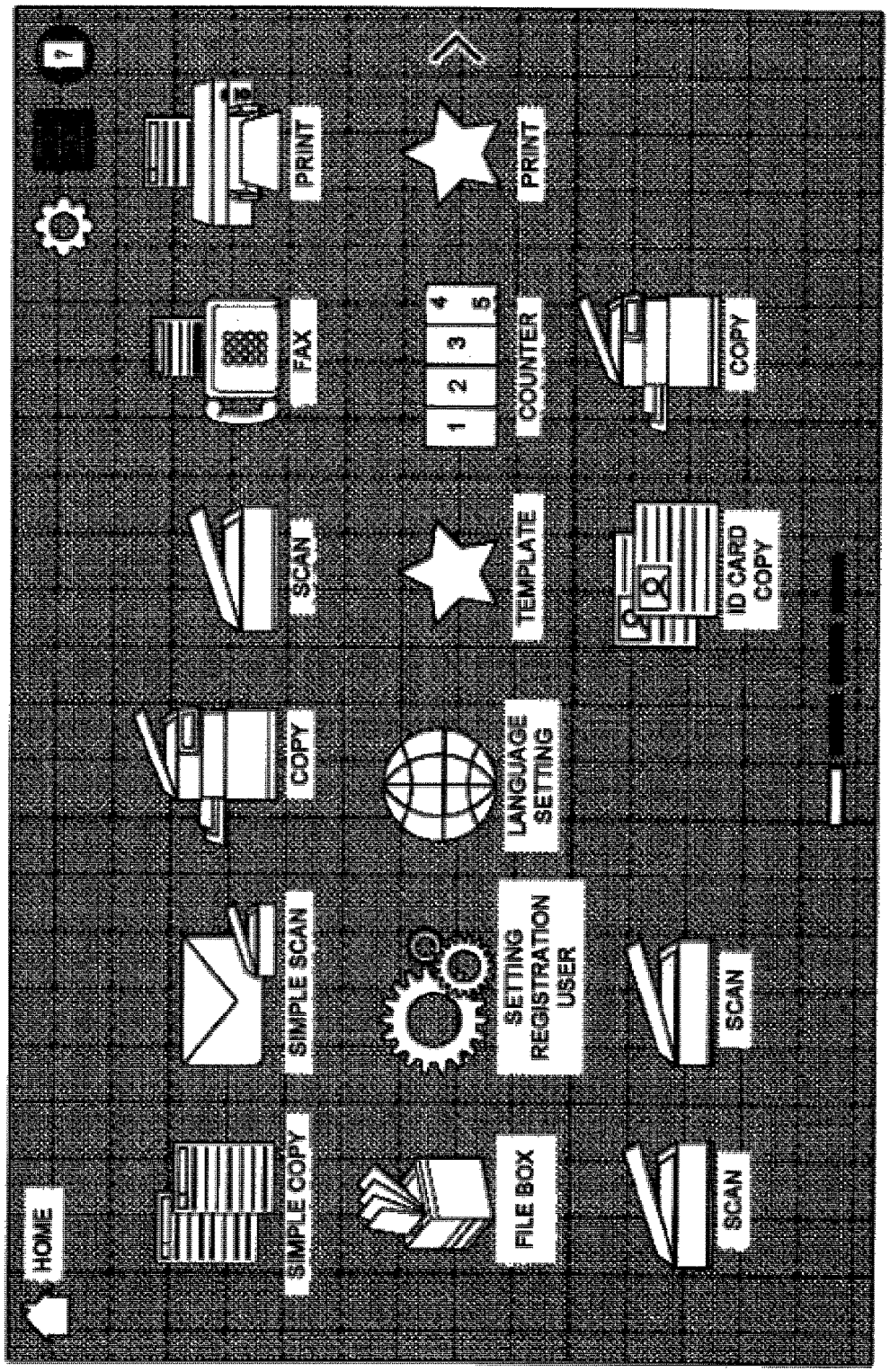
FIG. 9 is a diagram illustrating a specific example of information displayed on the display in a normal mode according to the first embodiment.

FIG. 9 is a diagram illustrating a specific example of the display on the display 101 in the normal mode according to the first embodiment. The image in FIG. 9 has a plain pattern. The color of the background image in FIG. 9 is different from the background image in the eco-mode, and, for example, blue.

Thus, in the image forming apparatus 1 according to the first embodiment, the background images displayed on the display 101 are different due to the difference in the current modes. FIG. 8 and FIG. 9 show a case in which the difference in the operation modes is indicated only by the color difference of the background images as a specific example, but the difference in the operation modes is not necessarily indicated only by the color difference. For example, the difference in the operation modes may be indicated by a difference in the patterns of the background images.

Figure 10:
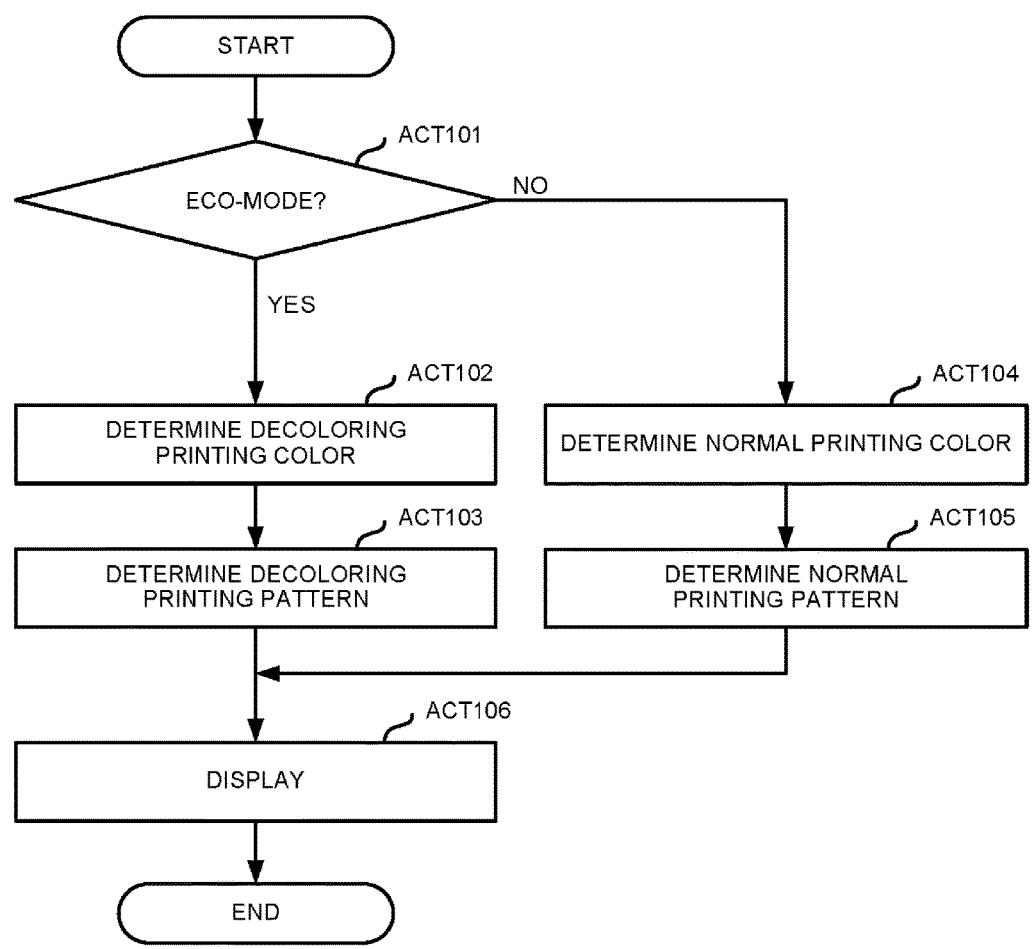
FIG. 10 is a flowchart depicting a specific process flow in which the image forming apparatus displays an image indicating a current mode on the display according to the first embodiment.

FIG. 10 is a flowchart depicting the flow of a processing in which the image forming apparatus 1 displays an image indicating the current mode on the display 101 according to the first embodiment.

If there is an input to the image forming apparatus 1 by the user, the image determination section 110 refers to the current mode information table 940 recorded in the auxiliary storage device 108. The image determination section 110 selects a record in which the function identified by the function name in the table which is referred to is the copy function. The image determination section 110 acquires the value of the current mode name of the selected record. The image determination section 110 determines whether or not the current mode indicated by the acquired value is the eco-mode (ACT 101). If the operation mode identified by the current mode name is the eco-mode (Yes in ACT 101), the image determination section 110 refers to the correspondence image information table 920 stored in the auxiliary storage device 108. The image determination section 110 selects a record in which the value of the mode name is the eco-mode among the records in the correspondence image information table 920.

The image determination section 110 determines the color indicated by the color scheme information of the selected record as the color of the background image of the image displayed on the display 101 (ACT 102). Next, the image determination section 110 determines the pattern indicated by the pattern information of the selected record as the pattern of the background image of the image displayed on the display 101 (ACT 103). The display controller 111 displays an image whose color and pattern of the background image are the color and pattern determined by the image determination section 110 on the display 101 (ACT 106).

On the other hand, if the operation mode identified by the current mode name is the normal mode (No in ACT 101), the image determination section 110 refers to the correspondence image information table 920 stored in the auxiliary storage device 108. The image determination section 110 selects a record in which the value of the mode name indicates the normal mode among the records in the correspondence image information table 920. The image determination section 110 determines the color indicated by the color scheme information of the selected record as the background color of the image displayed on the display 101 (ACT 104). Next, the image determination section 110 determines the pattern indicated by the pattern information of the selected record as the pattern of the background image of the image displayed on the display 101 (ACT 105). The display controller 111 displays an image of which the color and pattern of the background image are the color and pattern determined by the image determination section 110 on the display 101 (ACT 106).

Thus, the image forming apparatus 1 can display the background image corresponding to the current mode on the display 101 by executing the processing shown in the flowchart in FIG. 10.

If the image forming apparatus 1 has a function other than the copy function, the default record information may be set in the image forming apparatus 1. The default record information indicates a record selected by the operation mode determination section 109 when the user inputs an input other than the function selection input to the image forming apparatus 1. The record selected by the operation mode determination section 109 is a prescribed record among the plurality of records in the current mode information table 940. If the function selection input is input, the operation mode determination section 109 selects a record in which the function identified by the function name in the current mode information table 940 is a function indicated by the function selection input.

The image forming apparatus 1 configured in this manner displays an image indicating the operation mode of the image forming apparatus 1 as the background image. Therefore, the user can cause the image forming apparatus 1 to form an image according to the desired operation mode without performing an operation of confirming whether or not the operation mode is the desired operation mode.

Second Embodiment

Figures 11, 12:
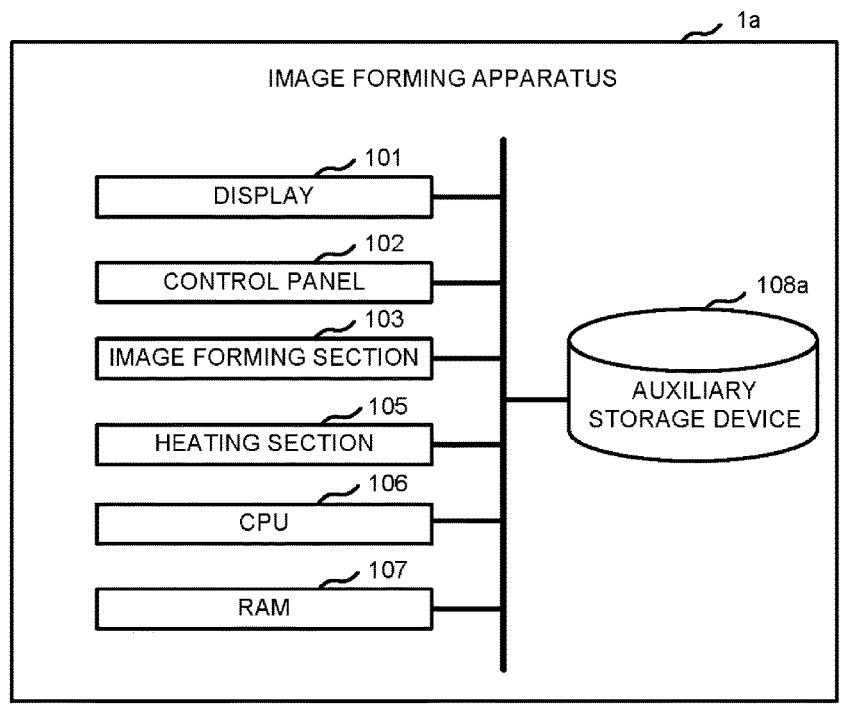
FIG. 11 is a diagram illustrating a specific hardware component of an image forming apparatus according to a second embodiment.
FIG. 12 is a diagram illustrating a specific example of number of times information according to the second embodiment.

FIG. 11 is a diagram illustrating a specific hardware component of an image forming apparatus 1a according to the second embodiment. The image forming apparatus 1a differs from the image forming apparatus 1 in that it includes an auxiliary storage device 108a instead of the auxiliary storage device 108. Below, for the components having the same functions as those of the image forming apparatus 1, the same reference numerals as those in FIG. 2 and FIG. 7 are denoted, and the description thereof is omitted. The image forming apparatus 1a has various functions which are the same as the image forming apparatus 1. For example, various functions include the copy function, the printer function, the FAX function, and the like. Below, for the sake of simplicity, the image forming apparatus 1a according to the second embodiment is described by assuming that it has only the copy function.

The auxiliary storage device 108a is configured by using a storage device such as a magnetic hard disk device or a semiconductor storage device. The auxiliary storage device 108a stores number of times information in addition to the information such as the operation mode information, the correspondence image information, the default information, and the current mode information stored in the auxiliary storage device 108. The number of times information indicates the number of times the image forming processing is executed by the image forming apparatus 1a for each operation mode.

FIG. 12 is a diagram illustrating a specific example of the number of times information according to the second embodiment. The number of times information is, for example, stored in the auxiliary storage device 108a as a number of times information table 950 shown in FIG. 12. The number of times information table 950 has one record having values of the number of times of the normal mode, the number of times of the eco-mode and the total number of times. The number of times of the normal mode indicates a cumulative number of times the image forming apparatus 1a carries out the image formation when the current mode name in the current mode information table 940 is the normal mode. The number of times of the eco-mode indicates a cumulative number of times the image forming apparatus 1a executes the image processing when the current mode name stored in the current mode information table 940 is the eco-mode. The total number of times indicates a cumulative number of times the image forming apparatus 1a executes the image formation.

For example, FIG. 12 indicates that the number of times the image formation is carried out in the normal mode is 10 times and the number of times the image formation is executed in the eco-mode is 20 times. FIG. 12 indicates that the total number of times the image formation is executed is 30 times.

Figure 13:
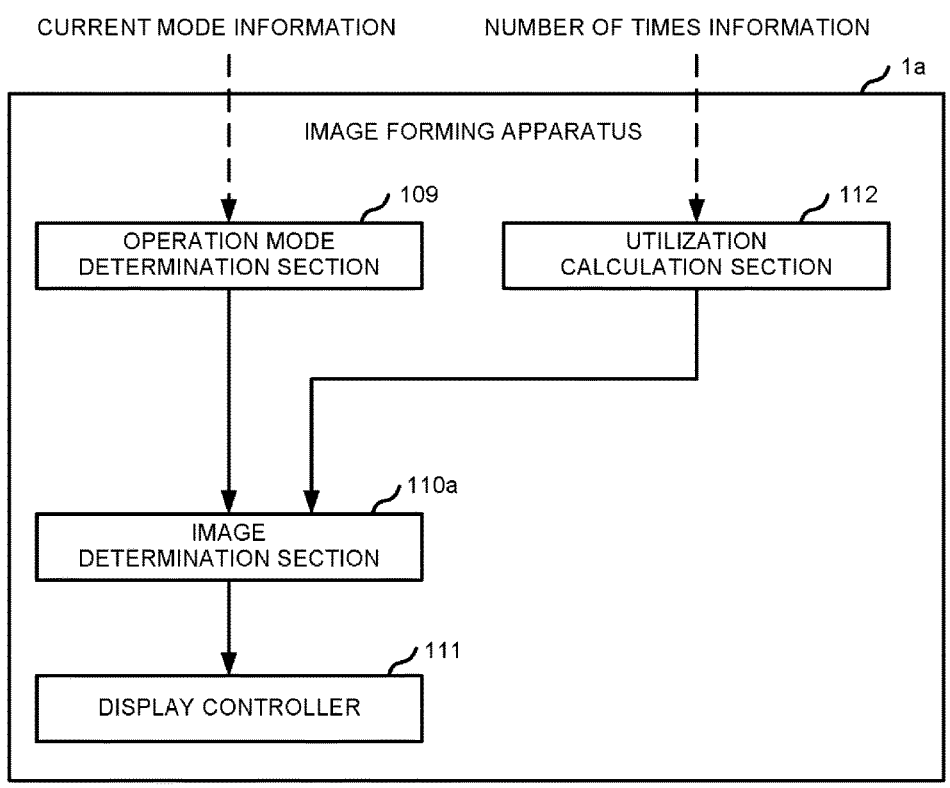
FIG. 13 is a block diagram illustrating specific functional components of the image forming apparatus according to the second embodiment.

FIG. 13 is a block diagram illustrating specific functional components of the image forming apparatus 1a according to the second embodiment. The image forming apparatus 1a differs from the image forming apparatus 1a in that it includes a utilization calculation section 112 and an image determination section 110a in place of the image determination section 110.

The utilization calculation section 112 calculates the utilization of the eco-mode based on the number of times information stored by the auxiliary storage device 108a. The utilization of the eco-mode may be a ratio to the normal mode or a ratio to the total number of times the image formation is executed by the image forming apparatus 1a. For the sake of simplicity, the utilization of the eco-mode is described below by assuming that it is utilization to the normal mode.

The image determination section 110a determines a correspondence image indicating the utilization of the eco-mode based on a calculation result of the utilization calculation section 112, the current mode information stored in the auxiliary storage device 108a, the correspondence image information stored in the auxiliary storage device 108a, and the function selection input.

The correspondence image indicating the utilization of the eco-mode may be any image as long as it indicates the utilization of the eco-mode. The correspondence image indicating the utilization of the eco-mode may be, for example, an image indicating the utilization with the density of the background color thereof.

Figure 14:
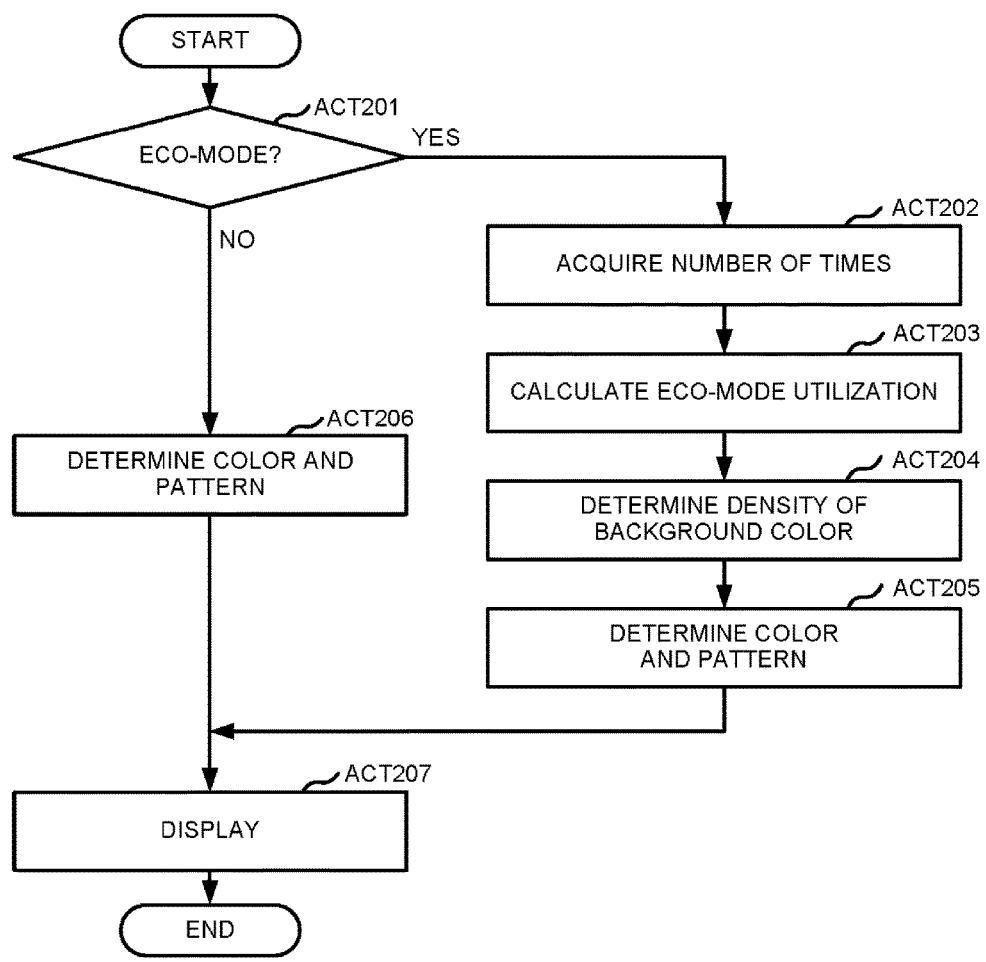
FIG. 14 is a flowchart depicting the flow of a specific processing in which the image forming apparatus displays an image indicating a current mode on the display 101 according to the second embodiment.

FIG. 14 is a flowchart depicting a specific flow of a processing in which the image forming apparatus 1a displays an image indicating the current mode on the display 101 according to the second embodiment.

If there is an input to the image forming apparatus 1a by the user, the image determination section 110a refers to the current mode information table 940 recorded in the auxiliary storage device 108a. The image determination section 110a selects a record of which the function identified by the function name of the table which is referred to is the copy function. The image determination section 110a acquires the value of the current mode name of the selected record. The image determination section 110a determines whether or not the current mode indicated by the acquired value is the eco-mode (ACT 201). If the operation mode identified by the current mode name is the eco-mode (Yes in ACT 201), the image determination section 110a refers to the number of times information table 950 stored in the auxiliary storage device 108a to acquire the number of times indicated by the number of times of the normal mode and the number of times indicated by the number of times of the eco-mode (ACT 202). The image determination section 110a calculates the utilization of the eco-mode based on the acquired number of times indicated by the number of times of the normal mode and the number of times indicated by the number of times of the eco-mode (ACT 203). The image determination section 110a determines the density of the background color of the image displayed on the display 101 according to the calculated utilization of the eco-mode (ACT 204). The density of the color may be variable as long as the density is based on the utilization, for example, it may be a density proportional to the utilization. For example, the density of the color may be a density determined based on information obtained by associating the utilization with the density which is stored in the auxiliary storage device 108a in advance. The image determination section 110a selects a record in which the value of the mode name indicates the normal mode among the records in the correspondence image information table 920. The image determination section 110a determines the color indicated by the color scheme information of the selected record as the background color of the image displayed on the display 101. The image determination section 110a determines the pattern indicated by the pattern information of the selected record as the pattern of the background of the image displayed on the display 101 (ACT 205). The display controller 111 displays an image with the pattern and the color having the density determined by the image determination section 110a as the background thereof on the display 101 (ACT 207).

On the other hand, if the operation mode indicated by the current mode name is the normal mode (No in ACT 201), the image determination section 110a refers to the correspondence image information table 920 stored in the auxiliary storage device 108a. The image determination section 110a selects a record in which a value of the mode name indicates the normal mode among the records of the correspondence image information table 920. The image determination section 110a determines the color indicated by the color scheme information of the selected record as the background color of the image displayed on the display 101. Next, the image determination section 110a determines the pattern indicated by the pattern information of the selected record as the pattern of the background of the image displayed on the display 101 (ACT 206). The display controller 111 displays an image with the pattern and the color having the density determined by the image determination section 110a as the background thereof on the display 101 (ACT 207).

The image forming apparatus 1a constituted in this way displays an image indicating the utilization of the operation mode of the image forming apparatus 1a with the color density of the background image. Therefore, the user can confirm the utilization of the eco-mode of the image forming apparatus 1a without performing an operation of confirming the utilization of the eco-mode.

The image forming apparatus 1a does not necessarily have to represent only the utilization of the eco-mode with the density of the background of the image but may represent the utilization of the normal mode. If the image forming apparatus 1a further has an operation mode in addition to the eco-mode and the normal mode, for example, the image forming apparatus 1a may represent the utilization of that operation mode.

Modification

Below, a modification common to the image forming apparatus 1 according to the first embodiment and the image forming apparatus 1a according to the second embodiment is shown. For the sake of simplicity, however, the description is made as a modification of the image forming apparatus 1 according to the first embodiment.

Figures 15, 16:
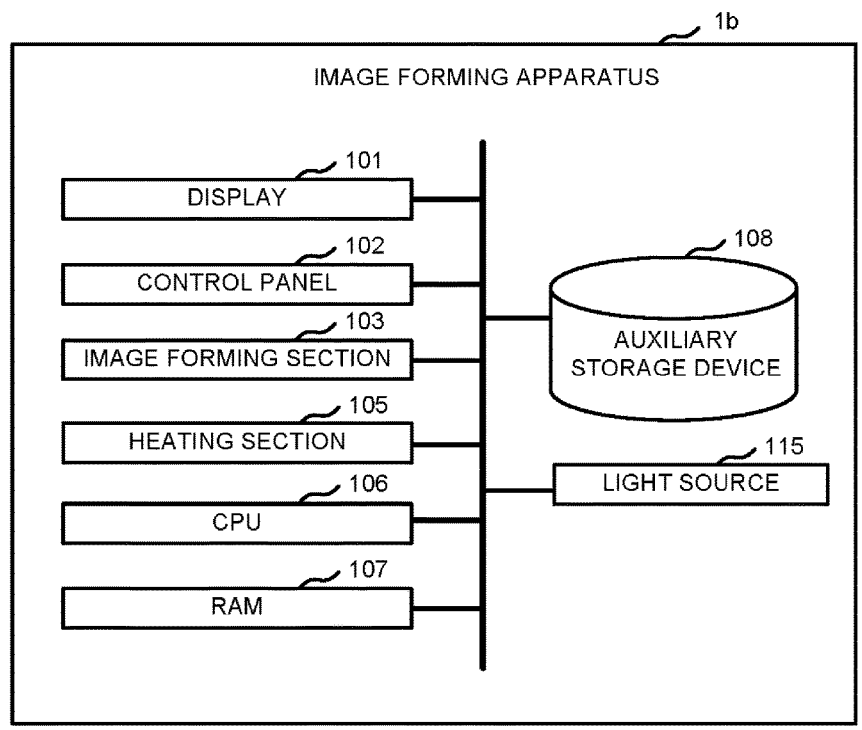
FIG. 15 is a block diagram illustrating a specific example of the functional components of an image forming apparatus according to a modification.
FIG. 16 is a diagram illustrating a specific example of the correspondence image information if a correspondence image indicates a current mode by an icon according to the first embodiment.

FIG. 15 is a block diagram illustrating a specific example of the functional components of an image forming apparatus 1b according to the modification. The image forming apparatus 1b is different from the image forming apparatus 1 in that it includes a light source 115. Below, the same reference numerals as in FIG. 2 are denoted to the components having the same function as those of the image forming apparatus 1, and the description thereof is omitted.

The light source 115 represents an operation mode of the image forming apparatus 1b. The light source 115 represents the operation mode of the image forming apparatus 1b with lighting, blinking, a color of light, and the like. The operation mode of the image forming apparatus 1b is an operation mode indicated by the current mode name in the current mode information table 940 stored in the auxiliary storage device 108. The light source 115 may be, for example, an LED (Light Emitting Diode) lamp or a light bulb.

For the sake of simplicity, it is assumed that the correspondence image indicates the operation mode with the background of the image displayed on the display 101. In the following, it is assumed that the correspondence image indicates the operation mode with an icon displayed on the display 101.

FIG. 16 is a diagram illustrating a specific example of the correspondence image information according to the first embodiment in a case in which the correspondence image indicates the current mode with an icon displayed on the display 101. For example, the correspondence image information is stored in the auxiliary storage device 108 as a correspondence image information table 920a shown in FIG. 16. The correspondence image information table 920a has a record for each mode name. Each record has values of the mode name, icon information and icon location information. The mode name is the same as that in FIG. 3. The icon information indicates an icon associated with the operation mode identified by the mode name. The icon location information indicates a location on a display screen of the display 101 of the icon associated with the operation mode identified by the mode name. For example, in a record 921a, the mode name is the normal mode, the icon indicating the normal mode is an icon A, and the location of the icon is the upper right on the display screen of the display 101.

The icon may be any icon as long as it has a display form capable of distinguishing the current mode. For example, the icon may have different icon shape or color scheme depending on the current mode. The arrangement of the icon may be different depending on the current mode. The arrangement is the location on the display screen of the display 101 of the icon. The density of the color of the icon may change depending on the current mode. The icon may be a blinking icon and may blink in response to the current mode. The icon may rotate on the display screen of the display 101 at an angular velocity in response to the current mode. The icon may be reversed on the display screen of the display 101 in response to the current mode. The icon may be an icon of which the color scheme changes according to the time and having the color scheme changing with time depending on the prescribed current mode. The icon may be an icon of which the shape changes according to time and having a shape changing with time depending on the current mode. The icon may be an icon of which the color density changes according to time and having the color density changing with time depending on the current mode. The icon may be an icon having a size corresponding to the current mode. The icon may be an icon of which a size changes according to time and having a size changing with time depending on the current mode. An aspect ratio of the icon may be an aspect ratio in response to the utilization of the current mode. The icon may be an icon of which the aspect ratio changes according to the time and having an aspect ratio changing with time depending on the utilization of the current mode.

In the image forming apparatus 1a according to the second embodiment, the icon may have a display form in response to the utilization of the prescribed mode in addition to the display form in response to the current mode. For example, the icon may have different icon shape or color scheme depending on the utilization of the prescribed mode. The arrangement of the icon may be different depending on the utilization of the prescribed mode. The density of the color of the icon may change depending on the utilization of the prescribed mode. The icon may be a blinking icon which blinks in response to the utilization of the prescribed mode. The icon may rotate on the display screen of the display 101 at an angular velocity in response to the utilization of the prescribed mode. The icon may be reversed on the display screen of the display 101 in response to the utilization of the prescribed mode. The icon may be an icon of which the color scheme changes according to the time and having the color scheme changing with time depending on the utilization of the prescribed mode. The icon may be an icon of which the shape changes according to time and having a shape changing with time depending on the utilization of the prescribed mode. The icon may be an icon of which the color density changes according to time and having the color density changing with time depending on the utilization of the prescribed mode. The icon may be an icon having a size in response to the utilization of the prescribed mode. The icon may be an icon of which a size changes according to time and having a size changing with time depending on the utilization of the prescribed mode. An aspect ratio of the icon may be an aspect ratio in response to the utilization of the prescribed mode. The icon may be an icon of which the aspect ratio changes according to the time and having an aspect ratio changing with time depending on the utilization of the prescribed mode.

Figure 17:
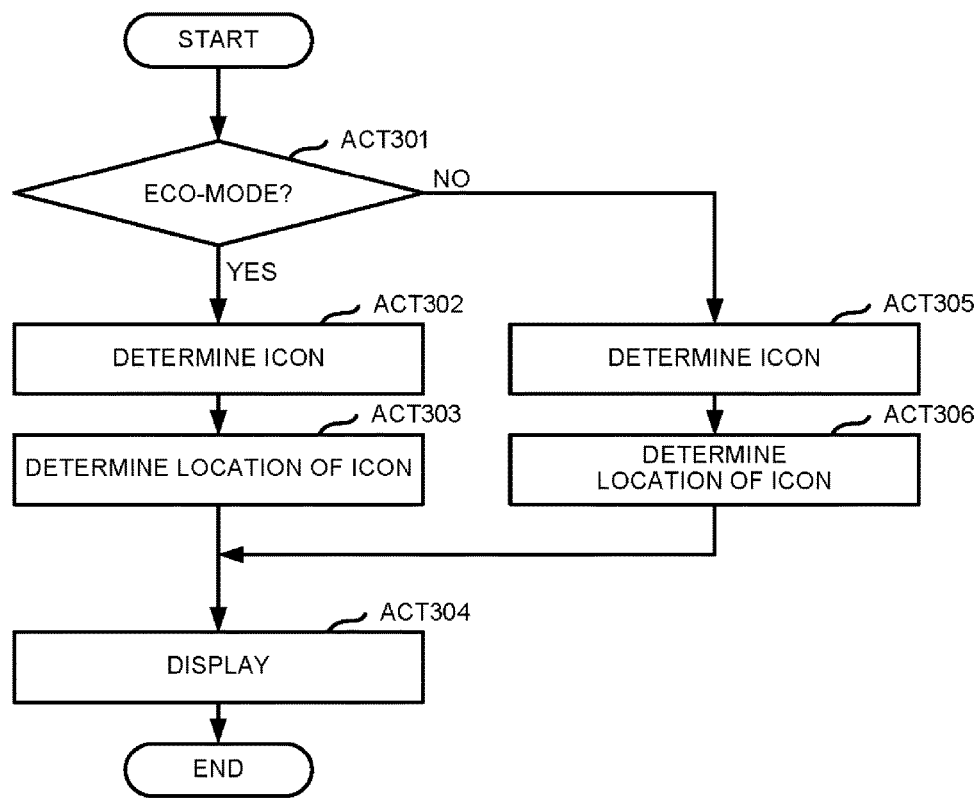
FIG. 17 is a flowchart depicting the flow of a specific processing in which the image forming apparatus displays an icon indicating the current mode on the display according to the first embodiment.

FIG. 17 is a flowchart depicting the specific flow of a processing in which the image forming apparatus 1 displays an icon indicating the current mode on the display 101 according to the first embodiment. Below, for the sake of simplicity, the image forming apparatus 1 according to the first embodiment is described by assuming that it has only the copy function.

If there is an input to the image forming apparatus 1 by the user, the image determination section 110 refers to the current mode information table 940 recorded in the auxiliary storage device 108. The image determination section 110 selects a record in which the function identified by the function name in the table which is referred to is the copy function. The image determination section 110 acquires the value of the current mode name of the selected record. The image determination section 110 determines whether or not the current mode indicated by the acquired value is the eco-mode (ACT 301). If the operation mode indicated by the current mode name is the eco-mode (Yes in ACT 301), the image determination section 110 refers to the correspondence image information table 920a stored in the auxiliary storage device 108. The image determination section 110 selects a record having a value of the mode name indicating the eco-mode out among the records in the correspondence image information table 920a. The image determination section 110 determines the icon indicated by the icon information of the selected record as the icon displayed on the display 101 (ACT 302). Next, the image determination section 110 determines the location indicated by the icon location information of the selected record as the location on the display screen of the display 101 of the icon (ACT 303). The display controller 111 displays the icon determined by the image determination section 110 at the location on the display screen of the display 101 determined by the image determination section 110 (ACT 304).

On the other hand, if the operation mode identified by the current mode name is the normal mode (No in ACT 301), the image determination section 110 refers to the correspondence image information table 920a stored in the auxiliary storage device 108. The image determination section 110 selects a record having a value of the mode name indicating the normal mode among the records in the correspondence image information table 920a. The image determination section 110 determines the icon indicated by the icon information of the selected record as an icon displayed on the display 101 (ACT 305). Next, the image determination section 110 determines the location indicated by the icon location information of the selected record as the location on the display screen of the display 101 of the icon (ACT 306). The display controller 111 displays the icon determined by the image determination section 110 at the location on the display screen of the display 101 determined by the image determination section 110 (ACT 304).

The image forming apparatus 1 configured in this way displays an icon indicating the operation mode of the image forming apparatus 1. Therefore, the user can cause the image forming apparatus 1 to form an image in the desired operation mode without performing an operation of confirming whether or not the operation mode is the desired operation mode.

The color of the correspondence image or the color scheme of the icon may be a color scheme based on color universal design.

The display 101 is an example of a display section.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
    an operation mode determination section configured to determine a current operation mode among a plurality of operation modes for executing an image forming process;
    a display section configured to display an image;
    an image determination section configured to determine an image indicating the operation mode determined by the operation mode determination section;
    a display controller configured to cause the display section to display the image determined by the image determination section and information for supporting an operation by a user relating to the image forming process; and
    an utilization calculation section configured to calculate utilization of a prescribed operation mode based on the number of times each operation mode is executed by the image forming apparatus, wherein the image determination section determines an image displayed on the display section based on the calculated utilization.

2. The image forming apparatus according to claim 1, wherein the operation mode determination section determines the current operation mode in response to an input to the image forming apparatus or time.

3. The image forming apparatus according to claim 2, wherein, if there is input to the image forming apparatus for instructing the operation mode, then the operation mode determined by the operation mode determination section corresponds to the input for instructing the operation mode.

4. The image forming apparatus according to claim 2, wherein, if there is no input to the image forming apparatus in a prescribed period, then the operation mode determined by the operation mode determination section is a default operation mode determined in advance in the image forming apparatus.

5. The image forming apparatus according to claim 1, wherein the image determination section determines a background image indicating the operation mode determined by the operation mode determination section.

6. The image forming apparatus according to claim 5, wherein the image determination section determines a color scheme or a pattern of the background image indicating the operation mode determined by the operation mode determination section.

7. The image forming apparatus according to claim 6, wherein the color scheme is based on a color universal design.

8. The image forming apparatus according to claim 1, wherein the image determination section determines an icon which is associated with a function of the image forming apparatus and indicates an operation mode determined by the operation mode determination section.

9. The image forming apparatus according to claim 8, wherein the image determination section determines a color scheme or shape of the icon.

10. The image forming apparatus according to claim 1, wherein the calculated utilization is a ratio of the number of times the image forming processing is executed in the prescribed operation mode to the number of times the image forming processing is executed in a predetermined prescribed operation mode among a plurality of operation modes.

11. The image forming apparatus according to claim 1, wherein the calculated utilization is a ratio of the number of times the image forming processing is executed in the prescribed operation mode to the number of times the image forming processing is executed by the image forming apparatus.

12. The image forming apparatus according to claim 1, wherein the image determination section is configured to determine a density of a color associated with the operation mode, wherein the density is a density of a background color of the image displayed on the display section based on the calculated utilization.

13. The image forming apparatus according to claim 1, further comprising:

a light source configured to emit light indicating an operation mode determined by the operation mode determination section.

14. The image forming apparatus according to claim 13, wherein the light source indicates the operation mode by blinking or lighting.

15. An image forming method, including:

determining a current operation mode among a plurality of operation modes for executing an image forming process;

displaying an image;

determining an image indicating the determined operation mode;

displaying the determined image and information for supporting an operation by a user relating to the image forming process; and calculating utilization of a prescribed operation mode based on the number of times each operation mode is executed by an image forming apparatus, wherein the image displayed is determined based on the calculated utilization.

16. The image forming method according to claim 15, wherein the step of determining the image comprises:

determining a background image indicating the operation mode and/or an icon associated with a function of an image forming apparatus and indicating the operation mode.

17. The image forming method according to claim 15, further comprising:

emitting light to indicate an operation mode from the plurality of operation modes.

18. A non-transitory, computer readable recording medium for storing a program for controlling a computer to determine a current operation mode among a plurality of operation modes for executing an image forming processing;

display an image;

determine an image indicating the determined operation mode; and display the determined image and information for supporting an operation by a user relating to the image forming processing; and calculating utilization of a prescribed operation mode based on the number of times each operation mode is executed by an image forming apparatus, wherein the image displayed is determined based on the calculated utilization.

* * * * *